United States Patent [19]

Benquey et al.

[11] Patent Number: 4,551,790

[45] Date of Patent: Nov. 5, 1985

[54] LIGHT RAMP FOR LIGHTING INSTRUMENT PANELS, MORE ESPECIALLY IN AIRCRAFT OR HELICOPTER

[75] Inventors: Jean Benquey; Louisa F. Benquey, both of Rabastens De Bigorre, France

[73] Assignee: Societe d'Exploitation du Laboratoire Abadie, Vic En Bigorre, France

[21] Appl. No.: 503,495

[22] Filed: Jun. 13, 1983

[30] Foreign Application Priority Data

Apr. 20, 1983 [FR] France ................. 83 06502

[51] Int. Cl.⁴ ........................................... G01D 11/28
[52] U.S. Cl. ..................................... 362/23; 362/231; 362/234; 362/242; 362/248
[58] Field of Search ................. 362/23, 62, 248, 351, 362/231, 293, 230, 234, 236, 242

[56] References Cited

U.S. PATENT DOCUMENTS

| | | | |
|---|---|---|---|
| 1,685,421 | 9/1928 | Huntington | 362/23 |
| 1,786,768 | 12/1930 | Moorhouse | 362/23 |
| 1,947,377 | 2/1934 | Blanchard | 362/23 |
| 1,951,783 | 3/1934 | Beard | 362/62 |
| 2,806,936 | 9/1957 | Janes et al. | 362/23 |
| 2,874,269 | 2/1959 | Greenlee | 362/293 |
| 2,963,571 | 12/1960 | Roggan | 362/23 |

Primary Examiner—Andrew M. Dolinar
Attorney, Agent, or Firm—Warren B. Kice

[57] ABSTRACT

A light ramp for lighting instrument panels, more especially in aircraft or helicopters, characterized in that it comprises, in combination, at least one fluorescent tube (5) emitting in the ultra-violet spectrum, housed inside a frame (6) disposed in front of the instrument panel (1), and a plate made from Wood's glass (7) sealingly fixed to the frame (6) in front of said fluorescent tube (5).

3 Claims, 3 Drawing Figures

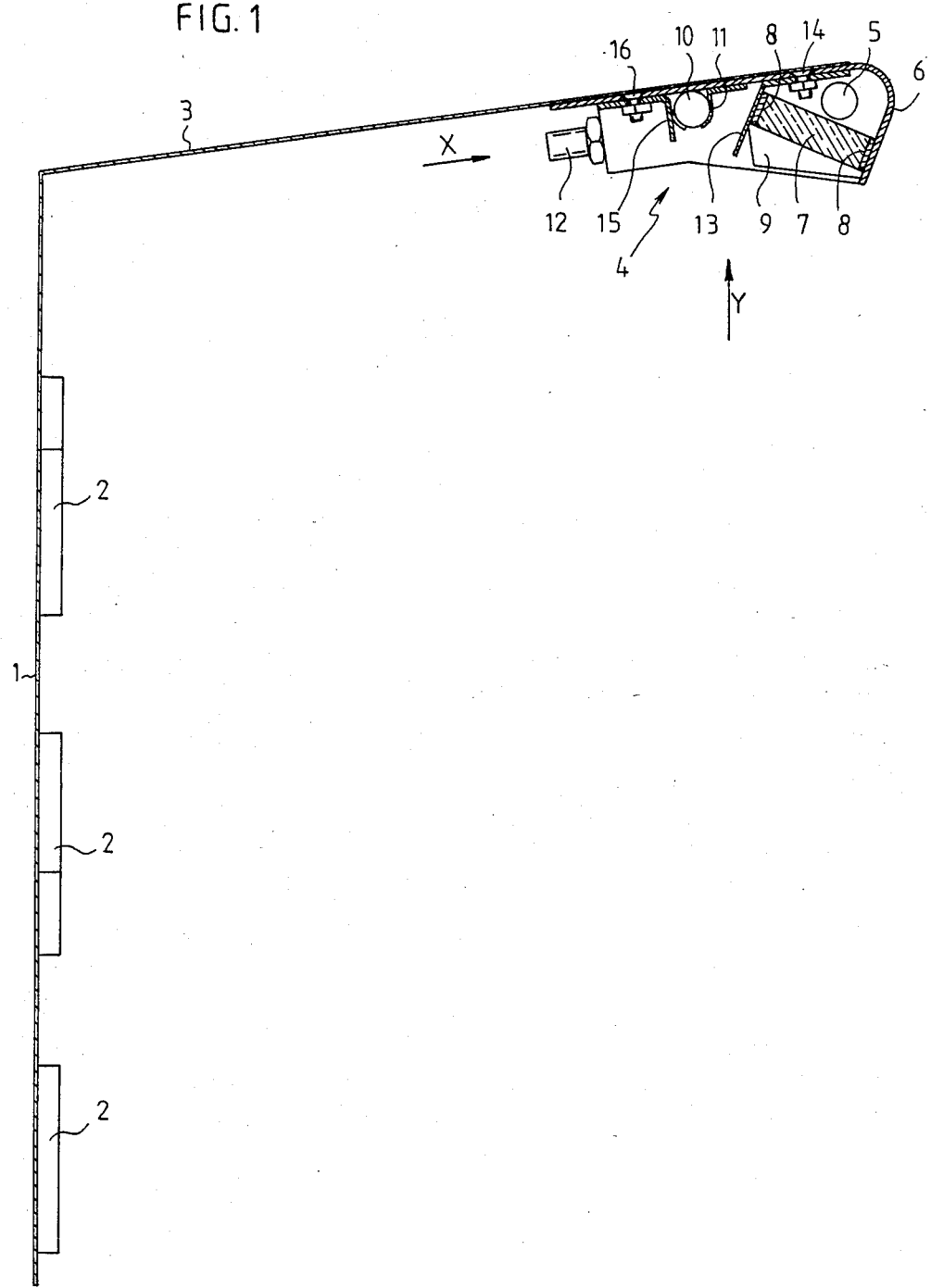

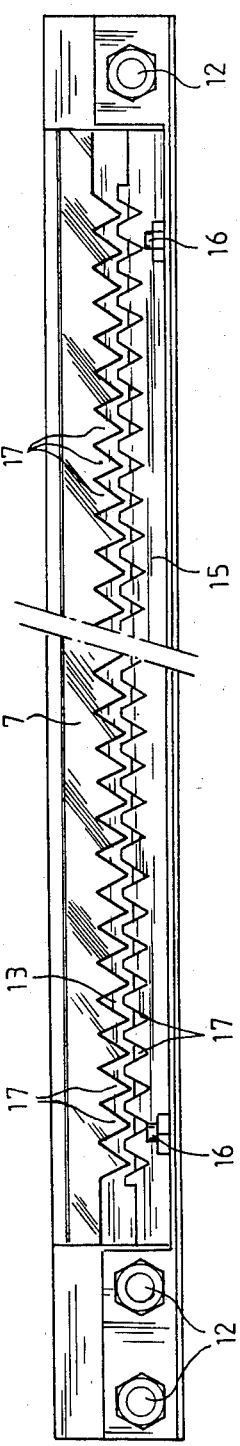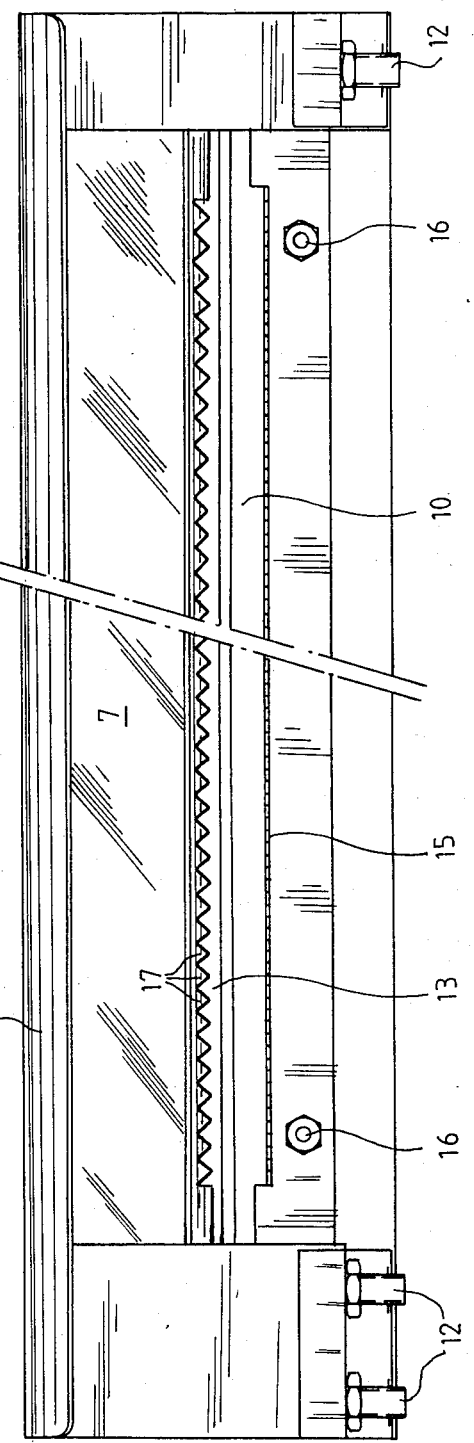

LIGHT RAMP FOR LIGHTING INSTRUMENT PANELS, MORE ESPECIALLY IN AIRCRAFT OR HELICOPTER

The present invention relates to a light ramp for lighting instrument panels, intended more especially for aircraft or helicopters.

It is known that at the present time, in certain aircraft or helicopters, the crew use light amplifying binoculars. In this case, it is indispensable to cut out inside the cockpit all trace of light in the visible spectrum, for that would disturb vision through said binoculars.

Now, the ultra-violet radiation fluorescent tubes at present available on the market, even when they are made from Wood's glass, let through about 3 to 7% of visible light, which is quite prohibitive.

The present invention has then as its principal aim to remedy this disadvantage and, for this, it provides a light ramp which is essentially characterized in that it comprises, in combination, at least one fluorescent tube emitting in the ultra-violet spectrum, housed in a frame disposed in front of the instrument panel, and a plate of Wood's glass sealingly fixed to the frame in front of the fluorescent tube.

Thus, fairly powerful ultra-violet lighting is obtained without any trace of visible light.

Preferably, the light ramp is also provided with a white, amber or red fluorescent tube. Of course, this latter will only be lighted outside the periods of use of the light amplifying binoculars.

Moreover, each of these two tubes is associated with a deflector provided with appropriate cut-outs, so as to provide uniform lighting of the surface of the instrument panel.

One embodiment of the invention is described hereafter by way of example, with reference to the accompanying drawings in which:

FIG. 1 is a simplified sectional view of an instrument panel equipped with a lighting ramp in accordance with the invention;

FIG. 2 is an elevational view of the ramp in the direction of arrow X in FIG. 1; and FIG. 3 is an elevational view of the ramp in the direction of arrow Y in FIG. 1.

Referring first of all to FIG. 1, an instrument panel 1 can be seen, for example for an aircraft, comprising a number of instruments 2. This instrument panel has mounted thereover a glare-shield 3 to which is fixed, by screws or by means of a rapid disassembly system, a light ramp 4 for lighting the different instruments 2.

In accordance with the invention, ramp 4 comprises essentially, in combination, an ultra-violet radiation fluorescent tube 5, disposed inside a metal frame 6 and a plate 7 of Wood's glass fixed sealingly to said frame, by means of seals such as 8, in front of tube 5. This latter may be made from ordinary glass or Wood's glass, but plate 7 will be designed so as to let pass no more than 0.5% of visible light, thus allowing the crew of the aircraft to use light amplifying binoculars under excellent conditions.

The assembly formed by tube 5 and the glass plate 7 may be secured to frame 6, or may be removable so as to facilitate mounting of the two elements, this mounting being effected by means of metal end-pieces 9.

The light ramp 4 is moreover equipped with a white, amber or red fluorescent tube 10 for lighting the instrument panel 1 outside the periods when the crew are using the amplifying binoculars. This tube is fixed to the frame by means of half collars 11.

The two fluorescent tubes 5 and 10 are supplied with power through coaxial plugs 12, shown in FIGS. 2 and 3, so as to avoid formation of parasites.

So as to obtain homogeneous lighting of the surface of instrument panel 1, each of these fluorescent tubes is further associated with an apertured deflector. Tube 5 is thus associated with a deflector 13 secured to frame 6 by screws such as 14. Similarly, tube 10 is associated with a deflector 15 secured to the frame by screws such as 16.

As can be more clearly seen in FIGS. 2 and 3, the lower edges of these two deflectors are provided with cutouts 17, in the shape of a V in this example, whose number and dimensions depend essentially on the height of the instrument panel 1 and on the arrangement of the instruments 2. As a rule, the solid part of the deflector stops the light rays going to the top of the instrument panel which is always too strongly lighted, whereas the cut-out part of the deflector partially stops the light rays going to the middle part of the instrument panel. As for the low part of the instrument panel, which is the furthest from the light ramp 4, it is lit by rays which are obstructed by no obstacle.

We claim:

1. A light ramp for lighting instrument panels comprising a frame disposed in front of said panel, at least one fluorescent tube mounted to said frame for emitting ultra-violet light toward said panel, a filter plate sealingly fixed to said frame and extending between said panel and said fluorescent tube for filtering a portion of said ultra-violet light, and an additional fluorescent tube mounted to said frame in a spaced relation to said one fluorescent tube for emitting additional unfiltered light towards said panel.

2. The light ramp according to claim 1 further comprising deflector means mounted on said frame and extending between said filter plate and said panel and provided with appropriate cutouts to selectively block portions of the light from said one fluorescent tube passing through said filter plate in a manner to provide uniform lighting of the surface of said panel.

3. The light ramp according to claim 1 further comprising deflector means mounted on said frame and extending between said panel and said additional fluorescent tube and provided with appropriate cutouts to selectively block portions of the light from said additional fluorescent tube in a manner to provide uniform lighting of the surface of said panel.

* * * * *